S. G. Rayl.
Cultivator.
No. 96,838. Patented Nov. 16, 1869.
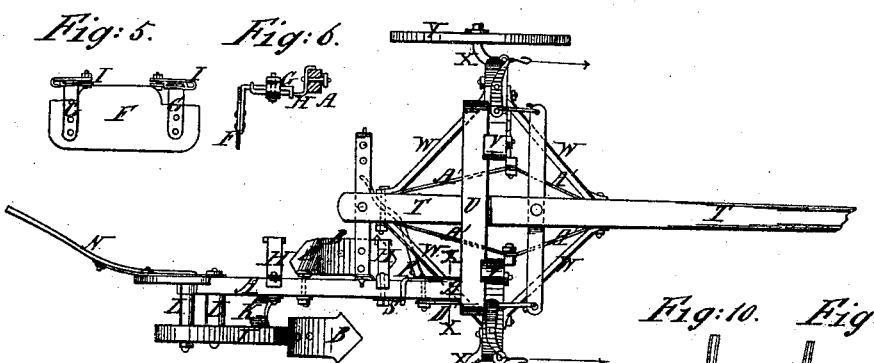
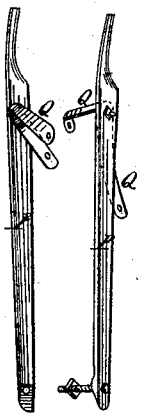
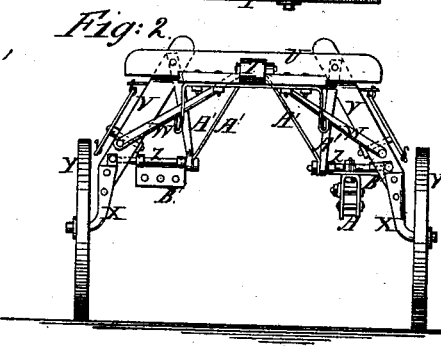
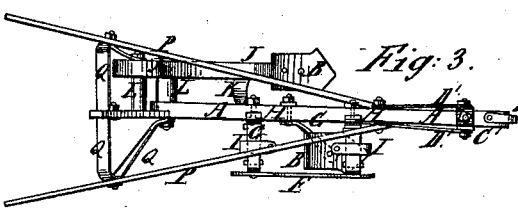
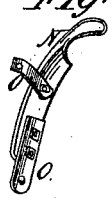
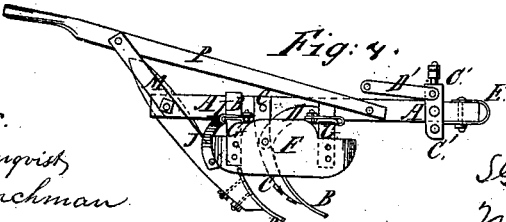
Witnesses.
A. W. Almquist
O. Hinchman
Inventor.
S. G. Rayl
per Munn & Co
Attys.

UNITED STATES PATENT OFFICE.

S. G. RAYL, OF AGENCY CITY, IOWA.

IMPROVEMENT IN COMBINED DOUBLE-SHOVEL AND TWO-HORSE CULTIVATOR.

Specification forming part of Letters Patent No. 96,838, dated November 16, 1869.

*To all whom it may concern:*

Be it known that I, S. G. RAYL, of Agency City, in the county of Wapello and State of Iowa, have invented a new and Improved Double-Shovel and Two-Horse Cultivator; and I do hereby declare that the following is a full, clear, and exact description thereof, which will enable others skilled in the art to make and use the same, reference being had to the accompanying drawings, forming a part of this specification, in which—

Figure 1 is a top view of my improved cultivator, some of the parts being detached. Fig. 2 is a rear view of the same, partly in section, through the line $x\, x$, Fig. 1. Fig. 3 is a detail top view of one of the double-shovel cultivators detached from the carriage. Fig. 4 is a side view of the same. Fig. 5 is a detail side view of the shield. Fig. 6 is a rear view of the same. Fig. 7 is a detail top view of the weed-trail and part of the beam. Figs. 8 and 9 are detail views of the hilling attachments. Figs. 10, 11, and 12 are detail views of the handles.

Similar letters of reference indicate corresponding parts.

My invention has for its object to furnish a simple, convenient, and effective two-horse cultivator for cultivating plants planted in rows, and which shall be so constructed and arranged that the double-shovel plows may be easily and quickly detached from the carriage and adjusted for use as single-horse cultivators; and it consists in the construction and combination of various parts of the machine, as hereinafter more fully described.

A are the plow-beams.

B are the shovels, the inner one of which, that runs next to the row of plants being cultivated, is attached to the curved iron standard C, in such a way that the upper end of said shovel may be unobstructed, so that the soil raised by the said shovel may fall back into the furrow from which it was raised, enabling the cultivator to be used for very small corn. The standard C is supported and strengthened by braces D, the forward one of which serves as a guard to prevent the shovel from becoming choked with weeds.

When the cultivator is used for hilling plants, an attachment, E, is secured to the shovel B by the same bolts with which the said shovel B is secured to the standard C. The attachment E is made of sheet-iron, and in about the shape shown in Figs. 1, 8, and 9, so as to guide the soil that rises over the shovel toward and around the roots of the plants.

F is the shield, which is adjustably attached to the vertical parts of the bent arms G according as it is desired to have more or less soil pass to the plants beneath the lower edge of said shield. The ends of the horizontal parts of the arms G have downwardly-projecting ears formed upon them, which clasp the edges of the arms H, which have upwardly-projecting ears formed upon their outer ends to clasp the side edges of the arms G. The inner ends of the arms H are securely attached to the beams A. In securing the shield to the beam the ends of the arms G and H are overlapped and are clamped to each other by the bent clamp I, the ends of which are pressed together by a bolt and nut, as shown in Figs. 3, 4, 5, and 6.

J are the standards of the outer shovels B, which are connected with the beams A by the braces K, and by long bolts passing through tubular washers L.

M is a standard, the lower end of which is attached to the rear end of the beam A, and which receives the bolt of the upper long washer, L.

N are the handles, which are connected to the rear end of the beam A and to the upper end of the standards M by brace-irons O, so that they can be readily detached and replaced with the handles P when the machine is to be used as single cultivators. The handles N are inclined to the left, so that the operator can walk at the side of the row of plants being cultivated. The forward ends of the handles P are detachably bolted to the forward parts of the beam A, and their rear parts are connected with the rear end of the plow-beam A and with the upper ends of the standards J and M by brace-irons Q, as shown in Fig. 3.

R is the weed-trail, which is made in about the shape shown in Figs. 1 and 7, and is secured to the forward part of the beam A by a bolt, the bent end that rests upon the top of the said beam A preventing the point of the trail from dropping down too far. If desired, the bent end of the trail R may be connected with the beam A by a connecting-bar, S, as shown in Fig. 7, to give it additional support. The trail R is designed to trail down the weeds that may grow close to the plants, so that they may be covered by the soil turned over by the plows.

T is the tongue, to the rear part of which is attached a cross-beam, U.

V are knees, the upper ends of which are securely attached to the ends of the cross-beam U, and the lower ends of which incline outward, as shown in Fig. 2, and are strengthened by braces W, extending forward and backward to the tongue.

To the lower ends of the knees V are attached crank-axles X, in such a way that the axis of the wheels Y, working upon the journals of said axles, may be in the rear of the knees V, as shown in Fig. 1.

To the lower ends of the knees V are attached inwardly-projecting rods Z, the inner ends of which are supported by braces A', extended up to the tongue T, and to the cross-beams U or upper part of the knees V.

To the rods Z are pivoted the swinging plates B', having holes formed through them, as shown in Fig. 2.

To the plates B' are swiveled the upper ends of the clevises C', by a bolt passing through one or the other of the holes in the said plates B', according as it is desired to adjust the cultivators farther apart or closer together. The lower ends or arms of the clevises C' are connected to the plow-beams A, in the rear of their forward end, by a bolt passing through said beams, and through one or the other of the holes in the said clevises. The upper ends of the clevises C' are supported against the draft-strain by the bars D', the forward ends of which are bolted to the upper parts of the clevises C', and the rear ends of which are bolted to the sides of the beams A, as shown in Figs. 1, 3, and 7. By this manner of attachment the forward ends of the plow-beams A may project in front of the cross-beams U, allowing the said plow-beams to be made of such a length as to adapt the cultivators for use without the carriage.

E' represents the ordinary double-tree clevis, which may remain attached to the forward end of said plow-beams, as shown in Figs. 3, 4, and 7.

Having thus described my invention, what I claim as new, and desire to secure by Letters Patent, is—

1. Connecting the inner shovels, B, to the plow-beams A by a curved standard, C, in such a way that the top of said shovels may be unobstructed, substantially as herein shown and described, and for the purpose set forth.

2. The shield F, constructed and connected with the plow-beams A, substantially in the manner herein shown and described, and for the purpose set forth.

3. Connecting the handles N and P, either or both, to the plow-beams A by a system of detachable braces, substantially as herein shown and described, and for the purpose set forth.

4. The pivoting-rods Z, perforated swinging plates B', clevises C', and bars D', with each other, and with the plow-beams A and carriage T U V, substantially as herein shown and described, and for the purpose set forth.

5. The carriage T U V X Y, constructed substantially as herein shown and described—that is to say, in such a way that the forward ends of the plow-beams A may project in front of the cross-beam U and knees V—as and for the purpose set forth.

S. G. RAYL.

Witnesses:
   JOHN Q. A. DAWSON.
   JOHN M. MURRAY.